United States Patent [19]

Shahar et al.

[11] Patent Number: 5,024,571
[45] Date of Patent: Jun. 18, 1991

[54] MULTI-LEVEL STORAGE STRUCTURE

[76] Inventors: Moshe Shahar; Gabriel Shahar, both of Sderot Jerusalem 96, Ramat-Gan, Israel

[21] Appl. No.: 454,590

[22] Filed: Dec. 21, 1989

[30] Foreign Application Priority Data

Dec. 26, 1988 [IL] Israel .......................................... 88806

[51] Int. Cl.[5] .............................................. B65G 65/00
[52] U.S. Cl. ...................... 414/231; 414/239; 414/263; 414/264; 414/280
[58] Field of Search ............... 414/227, 231, 232, 233, 414/234, 235, 239, 240, 241, 242, 243, 244, 245, 246, 252, 253, 255, 256, 258, 259, 260, 261, 262, 263, 264, 280, 286, 661

[56] References Cited

U.S. PATENT DOCUMENTS

| | | | |
|---|---|---|---|
| 3,390,791 | 7/1968 | Baldwin et al. | 414/252 X |
| 3,675,799 | 7/1972 | Steed et al. | 414/264 X |
| 3,786,942 | 1/1974 | Dane, Jr. | 414/286 X |
| 4,690,611 | 9/1987 | Nobuhara | 414/259 X |

Primary Examiner—David A. Bucci
Assistant Examiner—Craig Slavin
Attorney, Agent, or Firm—Sughrue, Mion, Zinn, Macpeak & Seas

[57] ABSTRACT

An automatic multi-level storage structure including a building structure having at least one entrance and exit station, a main floor directly accessible from the entrance station, and a plurality of storage levels, a plurality of object pallets provided with wheels and adapted to carry objects to be stored. The pallets are movable along, and guide by, a first track fixedly attached to the floor of the levels. There is also provided at least one storage elevator adapted to accommodate the object pallets and to move between the main floor and the plurality of storage levels, and transfer platforms permanently located in the elevator and provided with a second track fixedly attached to the platform. The second track is adapted to accept and guide the wheels of the object pallet, and is furnished with a driver for moving the object pallet onto and off of the transfer platform.

14 Claims, 15 Drawing Sheets

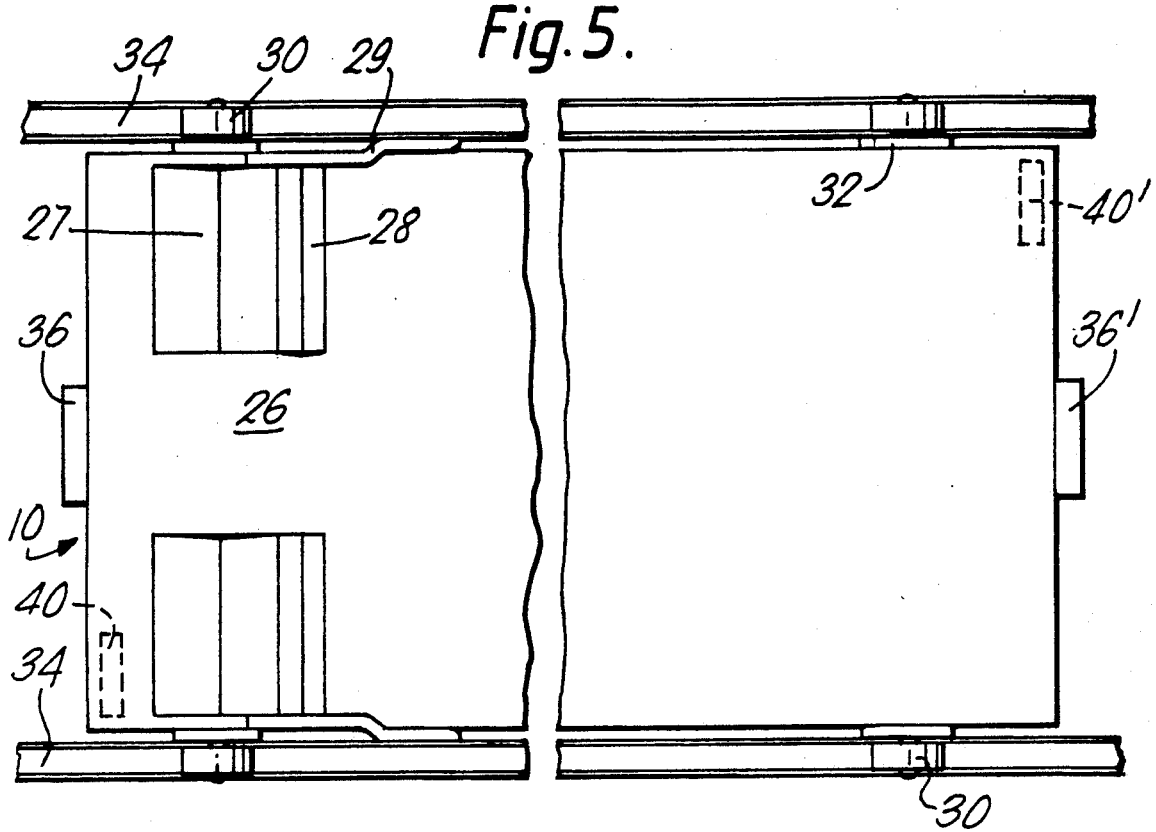
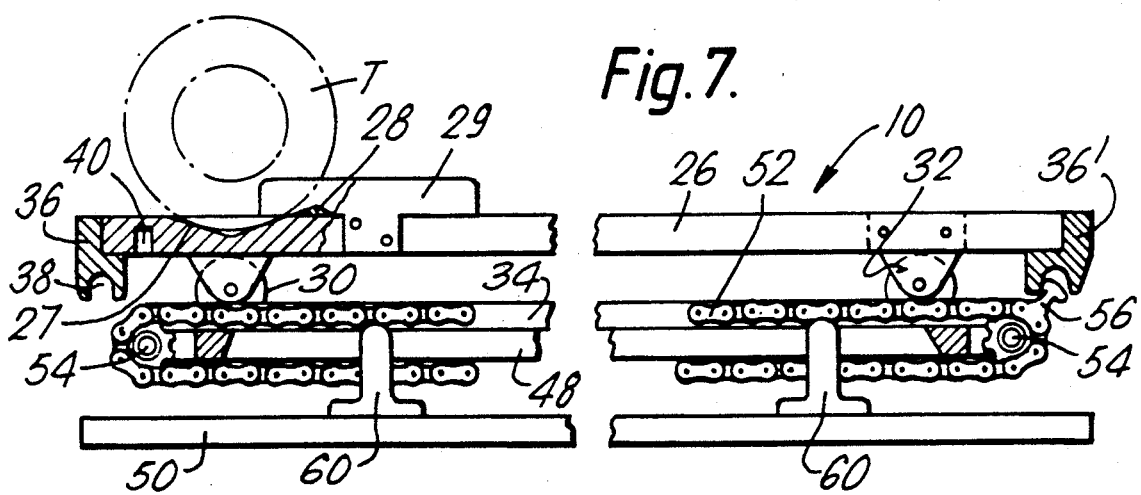
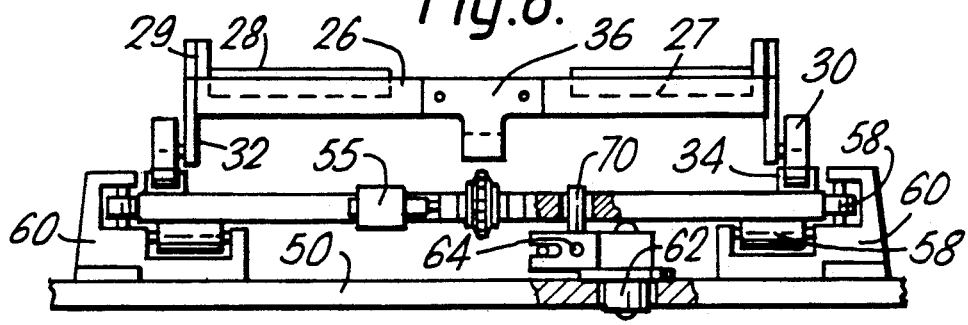

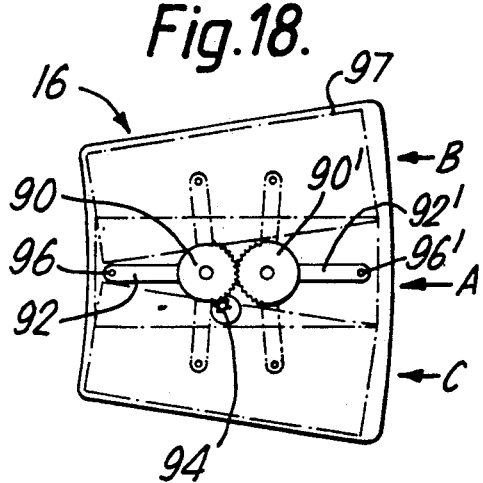
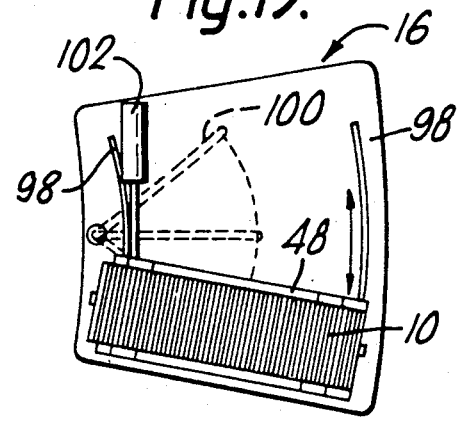
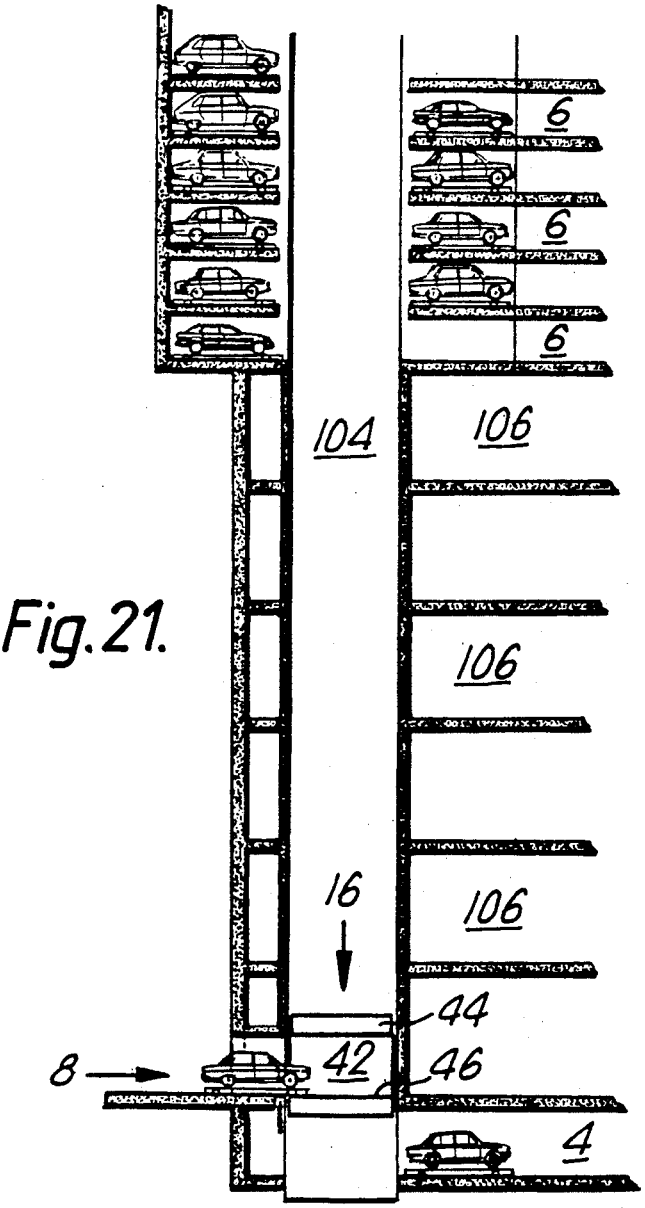

Driver Service Terminal

MULTI-LEVEL STORAGE STRUCTURE

The present invention relates to a multi-level storage structure for the automatic storing and retrieving of objects, in particular, but not exclusively, of such objects as road vehicles, shipping containers, crates, and the like.

Concerning the automotive application of the invention:

Parking in the commercial and entertainment centers of large cities has long been recognized as a problem to which a truly satisfactory solution has not yet been found. Today, two types of parking facilities are known, namely the single-level, mostly open-air parking lot, and the multi-level, underground and/or above-ground parking garage. The first type is extremely wasteful of space and does not protect the vehicle against the elements. The multi-level parking garage, while obviously making more rational use of the expensive piece of real estate on which it is built, still requires large, unoccupiable areas for maneuvering the vehicles into and out of the stalls, having to provide plenty of leeway also for indifferent to bad drivers. The very use of these garages is inconvenient and time-consuming, and searching through several levels for a vacant stall can indeed be a nerve-wracking experience, as is only to a slightly lesser extent the way back to the exit, which is preceded by first having to reach ones vehicle by riding elevators, using stairs and walking across dimly lit levels.

Efforts have therefore been invested in attempts to design mechanical parking garages which would be equipped to take over the vehicle at the entrance of the installation, park it at a vacant stall, and return it to the owner at the exit. However, as experience has shown, solutions proposed along this line are either impractical, inasmuch as parking and retrieval take a long time, because a single elevator cabin which is part of a gantry-type crane must serve several levels of juxtaposed parking stalls, or else they propose pieces of machinery of very large size and extreme complexity which are not only prohibitively expensive, but, because of their complexity, unsafe to operate unless, at very high costs, intensively serviced and maintained.

Similar problems of storage and retrieval are also experienced with shipping containers which, upon arrival at sea ports, are stacked in the port area in 4-5 layers one on top of the other. Although information as to the exact location of each container is stored in a computer, still, when a container to be released is located in the bottom layer, access for the purpose of retrieval is only possible by removing containers from the upper layers, which is a time-consuming procedure. These containers are then relocated elsewhere and although the central computer is supposed to be duly informed of such "changes of address," confusion as to the location of, and thus having to search for, a given container is a frequent occurrence and causes further losses of time and additional expenditure.

It is one of the objects of the present invention to overcome the drawbacks and disadvantages of prior-art storage facilities and to provide a computer-controlled multi-level storage structure in which objects are automatically stored and retrieved without need for human intervention, a storage structure that is relatively simple and does not require a large capital outlay; that is totally safe in operation with a minimum of maintenance requirements; that is "user-oriented" in design and facilities offered, and that reduces retrieval time to a minimum.

This, according to the invention, is achieved by providing an automatic multi-level storage structure comprising a building structure having at least one entrance and exit station for respectively introducing said object for the storing thereof and withdrawing said object after retrieval thereof, a main floor directly accessible from said entrance station, and a plurality of storage levels, a plurality of object pallets provided with wheels and adapted to carry objects to be stored, said pallets being movable along, and guided by, first track means fixedly attached to the floor of said levels, at least one storage elevator adapted to accommodate at least one of said object pallets at a time and vertically movable between said main floor and said plurality of storage levels, at least one transfer platform permanently located in said at least one elevator and provided with second track means fixedly attached to said platform, said second track means adapted to accept and guide the wheels of said object pallet, further provided with first drive means for moving said object pallet onto said transfer platform and subsequently moving it off said platform, wherein said transfer platform is engageable by at least second drive means enabling it to move longitudinally in both directions beyond the limits of said elevator far enough to ensure continuity, either on one side of said elevator or on the other side thereof, between said first track means fixedly attached to said level floors, and said second track means fixedly attached to said transfer platform, and wherein an object to be stored is moved onto one of said object pallets at said at least one entrance station and, for the duration of its stay in said storage structure, remains standing on the selfsame object pallet, being automatically moved therewith from an entrance station onto an elevator and from said elevator to a storage location on one of said levels and subsequently from said storage location, via said elevator, to said exit station.

As the invention in its underlying principles, its operation and its basic structure is essentially the same for both of the applications mentioned, it was thought to be proper if it were explained in detail as exemplified by the parking-garage embodiment, with complementary explanations referring specifically to the storage structure for shipping containers.

For a better understanding of the invention it is deemed advantageous to precede the detailed description thereof with a brief summary of the operational principles involved.

The automatic multi-level parking garage according to the invention is built around two major components and a control system:

a) A number of wheeled vehicle pallets onto which, at entrance stations, drivers deposit their vehicles and on which the vehicles remain standing for the duration of their stay in the parking garage:

b) A system of elevators located opposite each entrance station and provided with transfer platforms having means to automatically transfer the vehicle-carrying pallets from the entrance stations into these elevators, move them to a vacant parking stall on any of the parking levels and, again automatically, transfer those loaded pallets into their assigned stalls. For retrieval, the above sequence is reversed, the vehicle pallet carrying a vehicle to be returned to its owner is automatically transferred from its parking stall to a transfer platform in an elevator and moved to one of the discharging levels, whence it is transferred to an exit station, where it is picked up by its owner and driven off.

c) A control system assigning parking stalls and coordinating the respective movements of vehicle pallets, transfer platforms and elevators during parking as well as retrieval operations.

Considering the complexity of control operations involved in running such a relatively large installation, it is clearly advantageous to make use of computer and microprocessor technology.

Computer input is provided by the driver who, having driven his vehicle onto a vacant vehicle pallet, uses the nearest of a number of drivers' service terminals provided to key in the registration number of his vehicle, as well as a numerical code of his own choice. Special keys are also provided for services offered (gas, oil, air, wash. etc.). Having keyed in all information required, the driver presses the "parking" key, which initiates the above summarized automatic parking operations. The terminal also issues a receipt stating registration number, clock-in time as well as stall assigned.

For retrieval, the driver keyes in the registration number as well as his code number and is issued a bill which, when paid (coins, bills, credit cards), enables the "retrieve" key that, when pressed, initiates the above-mentioned retrieval sequence.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and, readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a partial top view of a preferred embodiment of the vehicle pallet with its four wheels inside guide rails.

FIG. 7 is a partial, schematic view of the vehicle pallet of FIG. 5, as mounted on the transfer platform:

FIG. 8 is a schematic head-on view, in partial transverse cross section, of the vehicle pallet as mounted on the transfer platform:

Figure 17A:
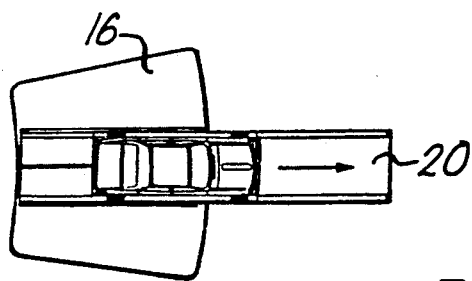
Figure 17B:
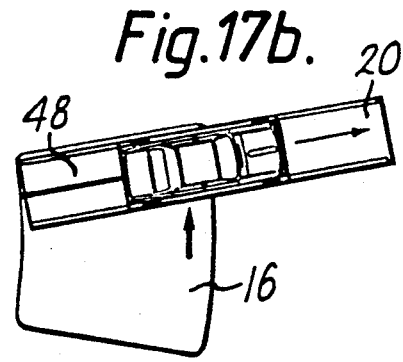
Figure 17C:
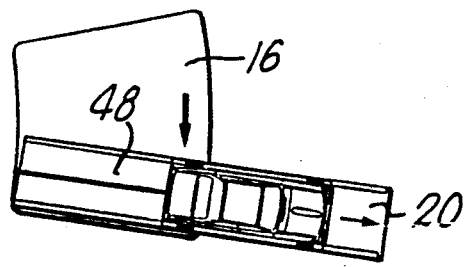

FIGS. 17a–17c schematically illustrate an elevator floor with the transfer platform in three different positions;

FIG. 18 schematically represents electromechanical means for shifting the platform of FIGS. 17–17c to the different positions.

Figure 20:
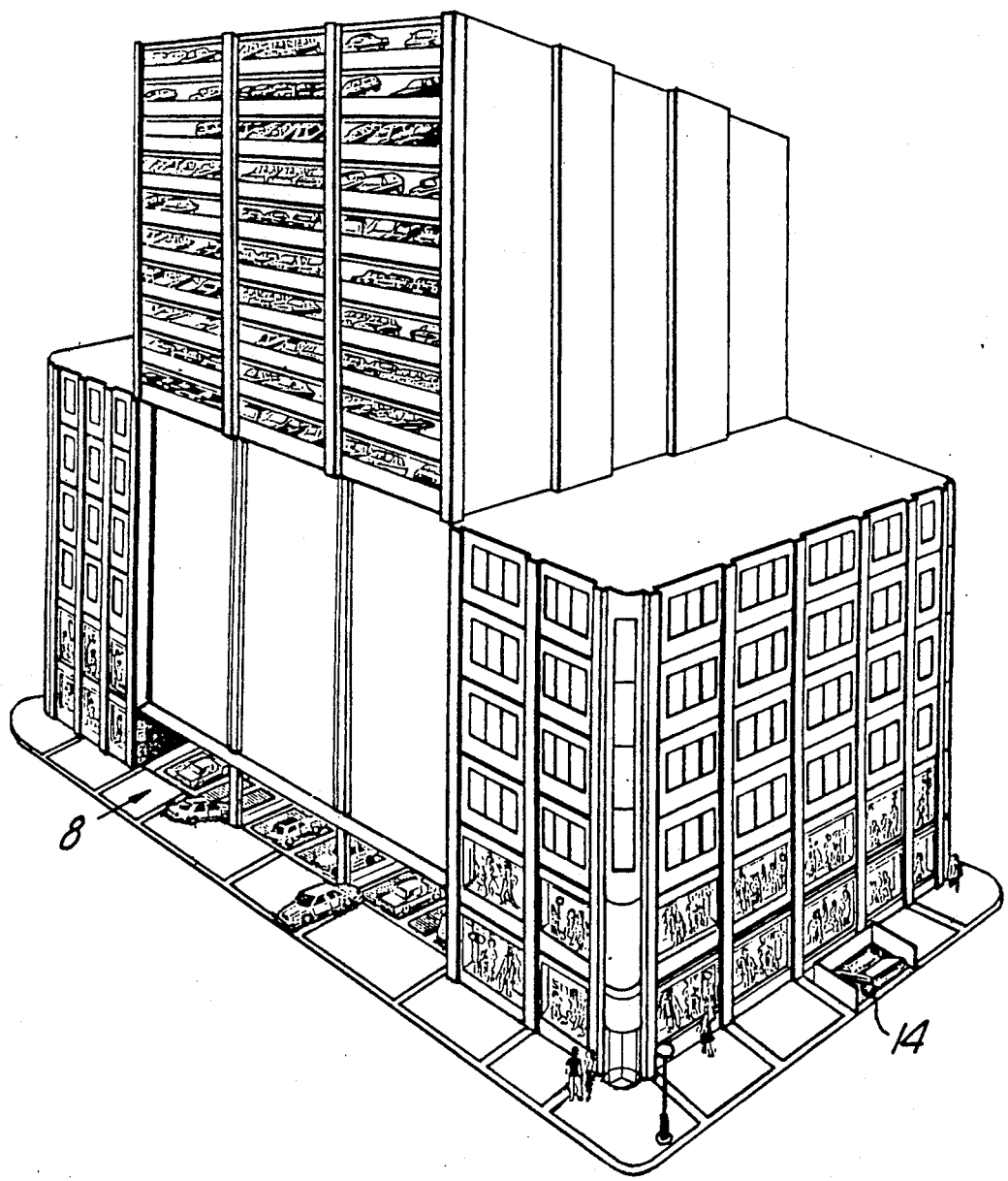
Figure 22:
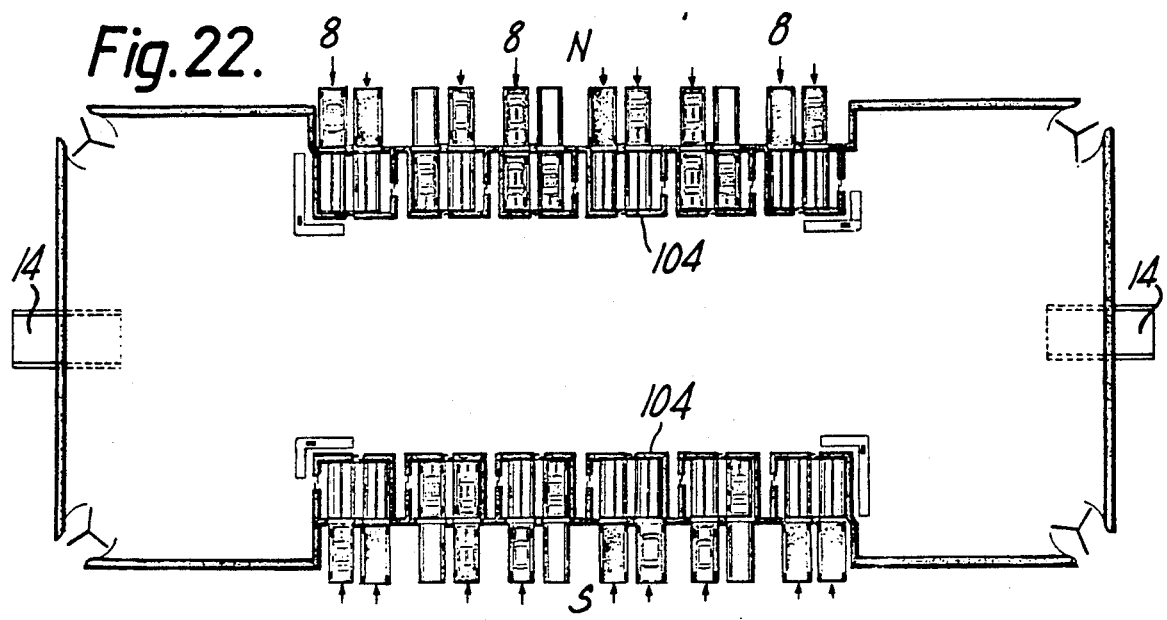
Figure 23:
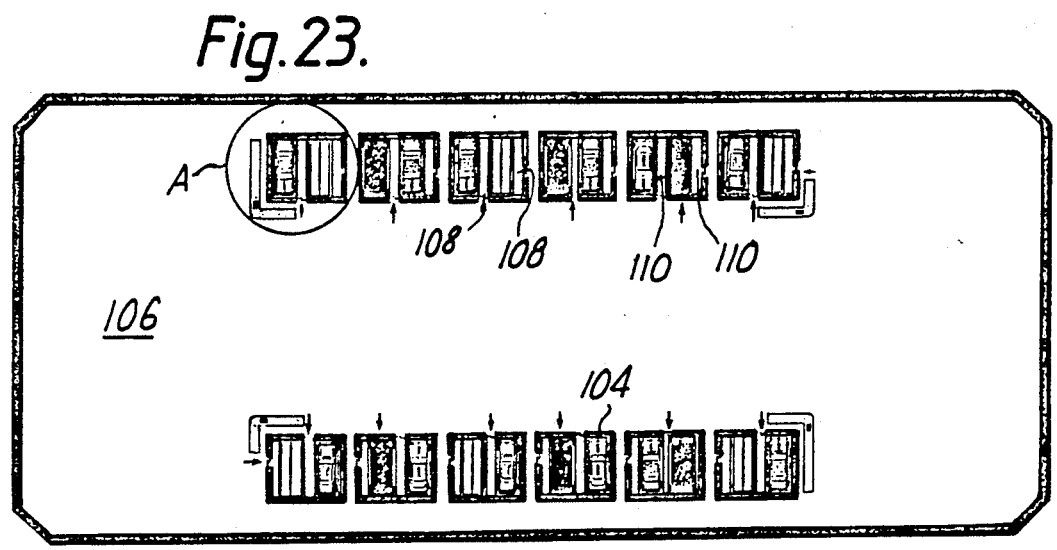
Figure 24:
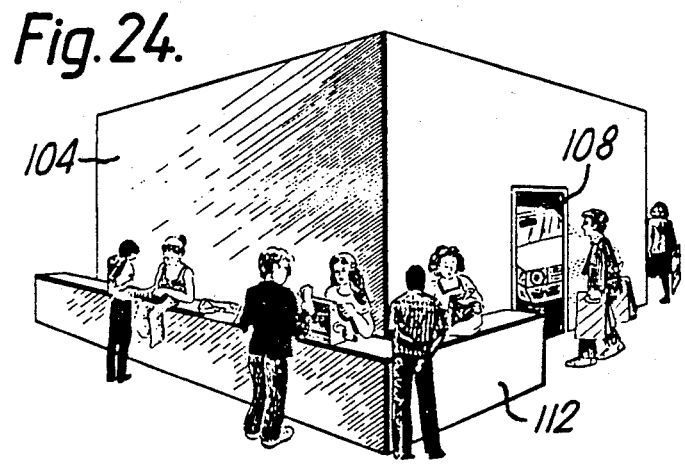
Figure 25:
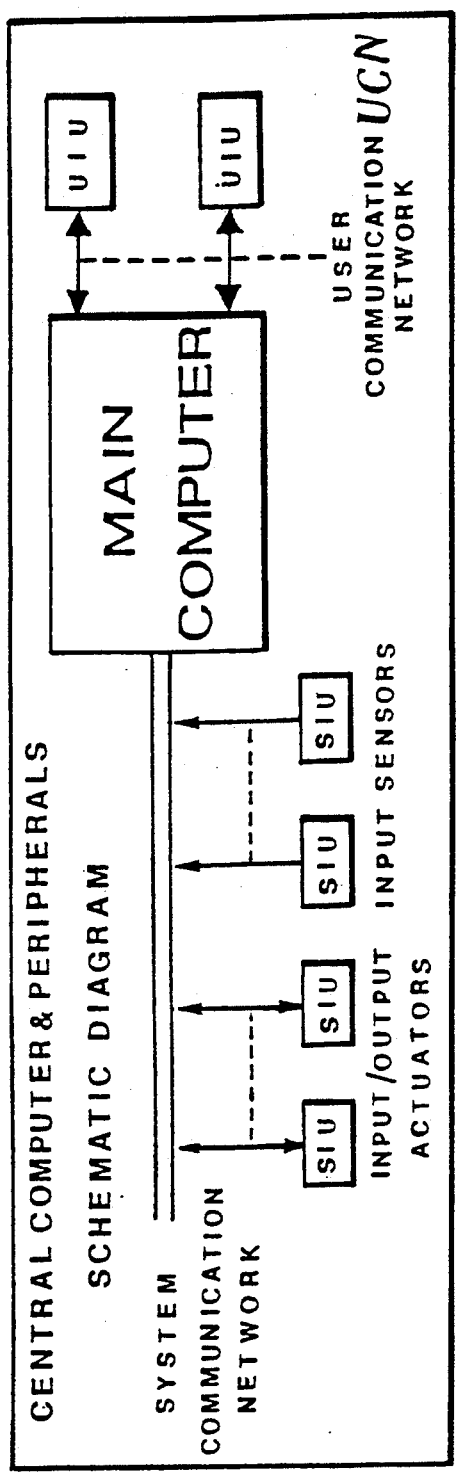
Figure 26:
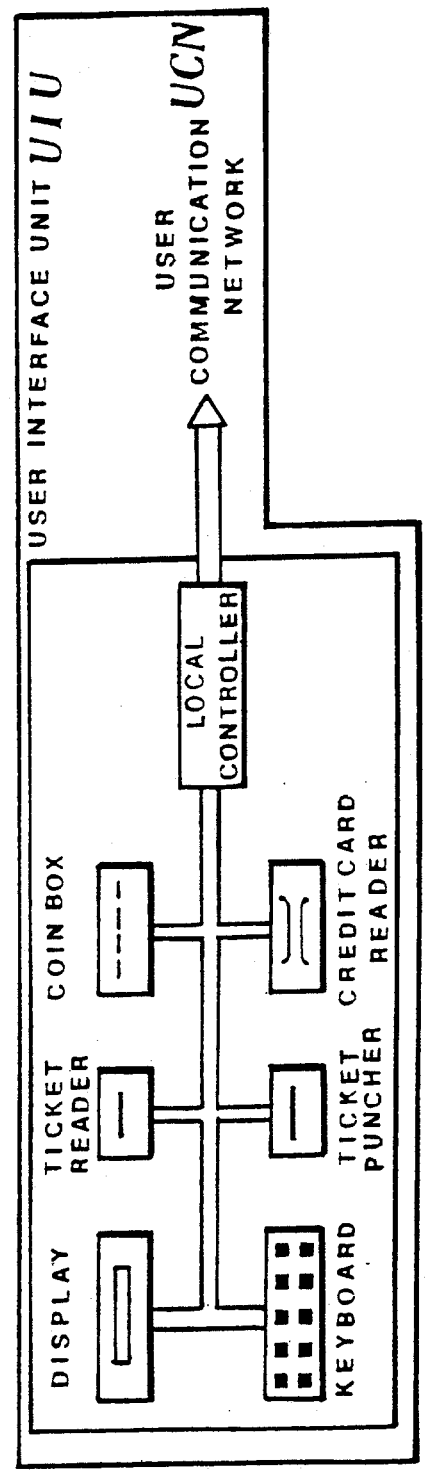

FIG. 19 schematically indicates hydraulic or pneumatic means for the same purpose;

FIG. 20 is a perspective view of a linear multi-level parking garage built on the roof of a multi-floor department store;

FIG. 21 represents a partial, cross-sectional view of the structure of FIG. 20, showing one of the elevator shafts rising from the basement through the shopping floors to the parking levels;

FIG. 22 is a top view of the ground floor of the structure of FIG. 20;

FIG. 23 is a top view of one of the shopping floors, showing the elevator shafts arranged in two rows:

FIG. 24 is a perspective view of detail A in FIG. 23, showing the entrance to one of the elevator shafts and customers' service counter;

FIG. 25 represents a general layout of the control system and its relationship to the main computer;

FIG. 26 is a block diagram of the driver service terminal.

Figure 27:
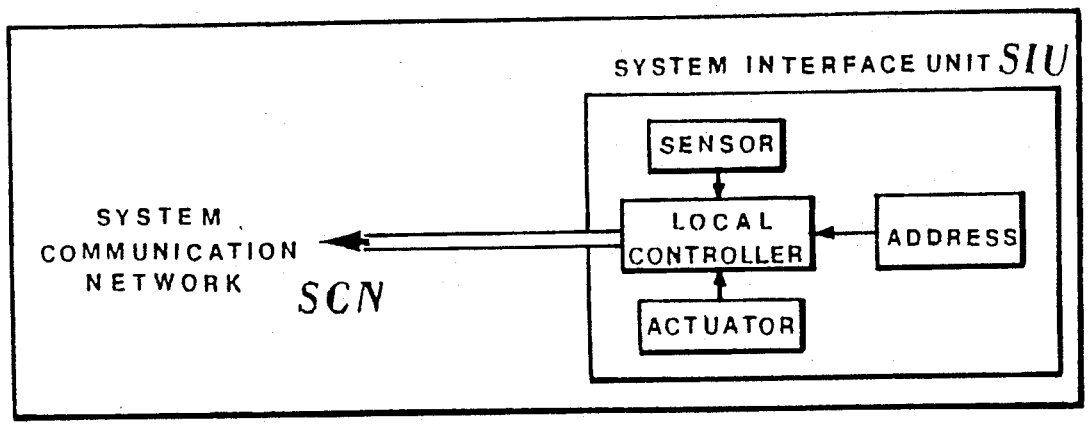
Figure 28:
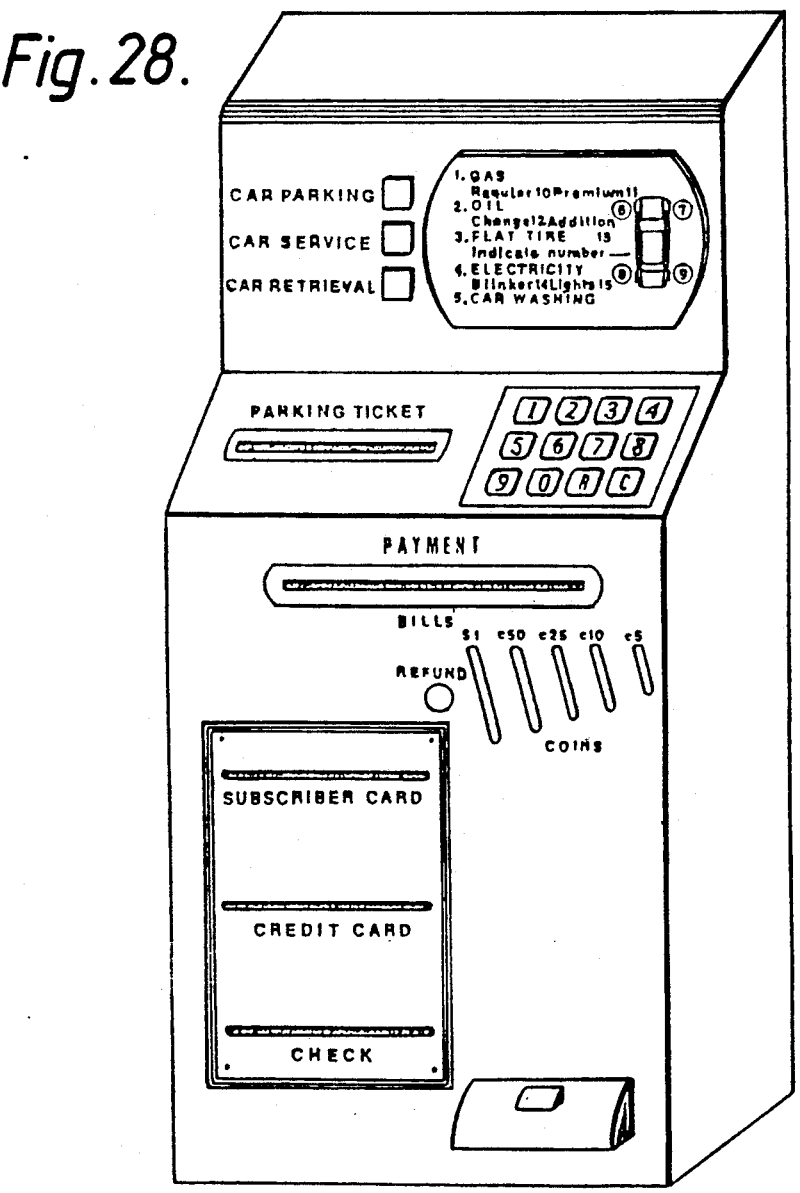
Figure 29:
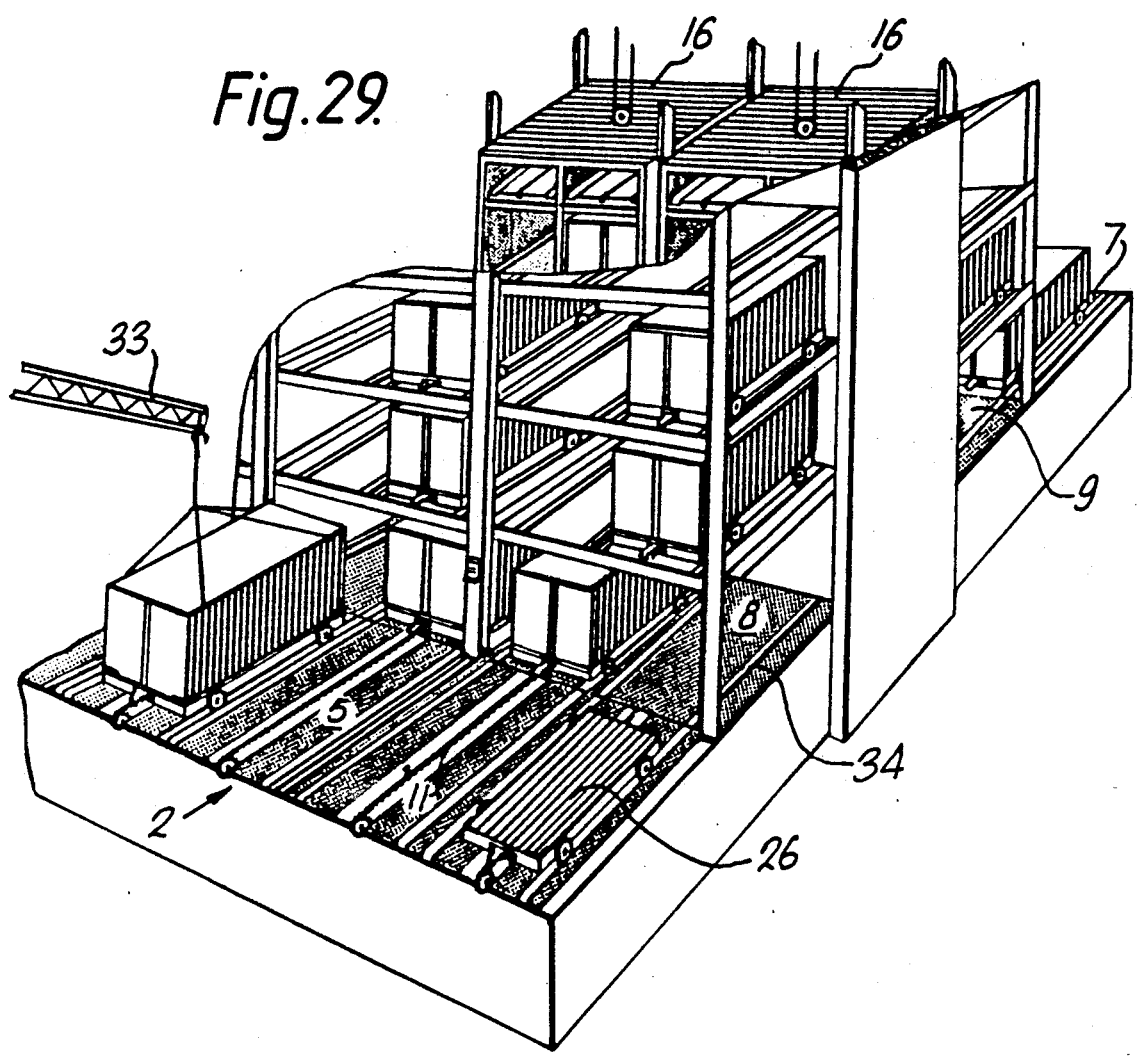
Figure 30:
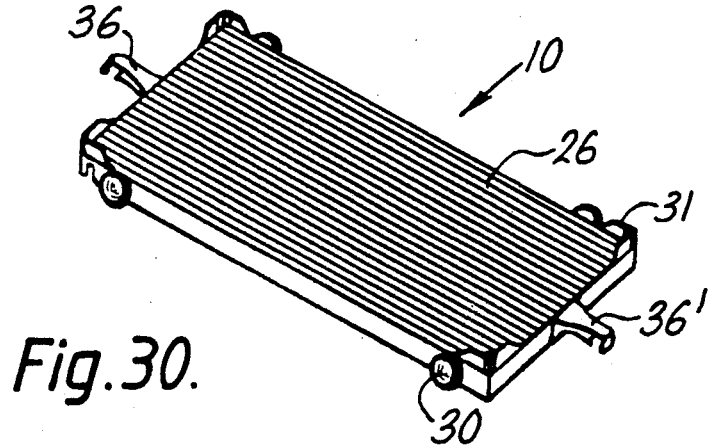

FIG. 27 is a block diagram of the system interface unit;

FIG. 28 is a pictorial description of the driver's service terminal;

FIG. 29 is a perspective view of a container storage structure according to the invention, and FIG. 30 is a similar view of the container pallet.

Figure 1:
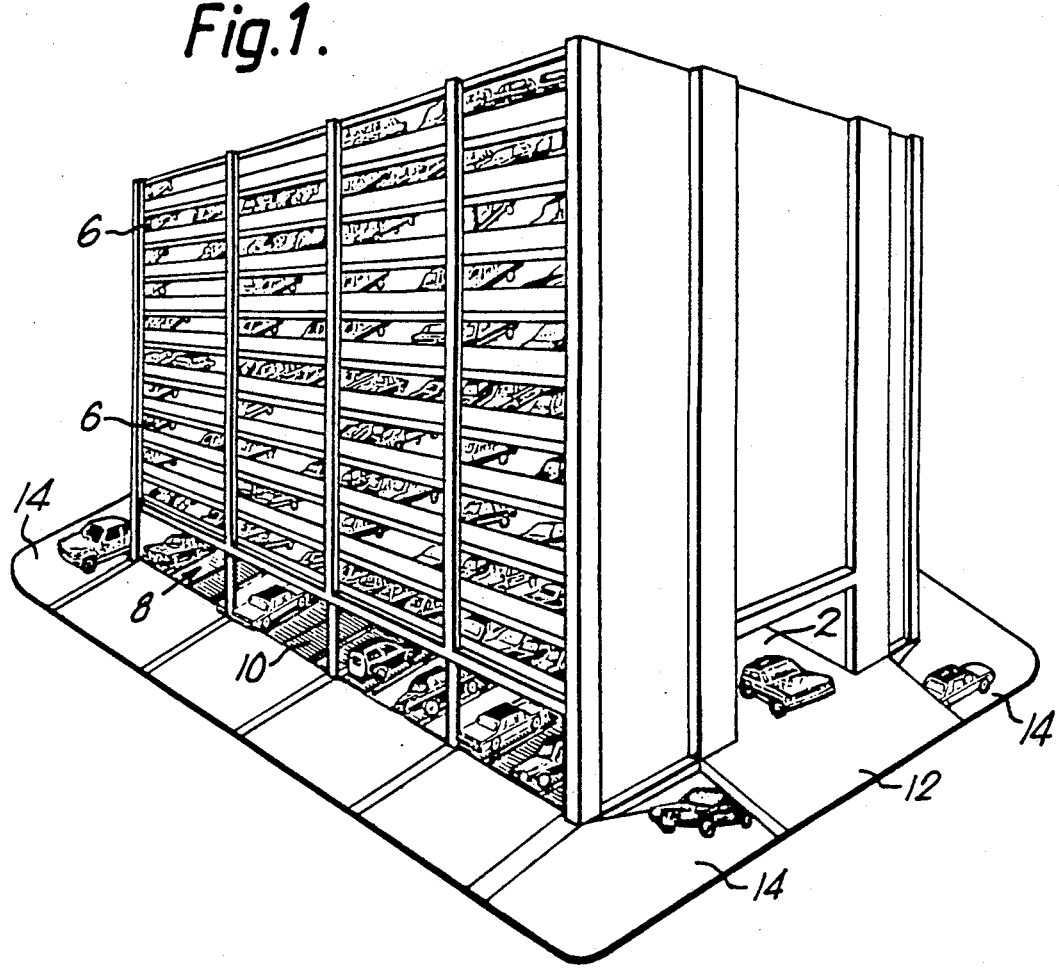
FIG. 1 is a perspective view of a linear multi-level parking garage according to the invention.
Figure 3:
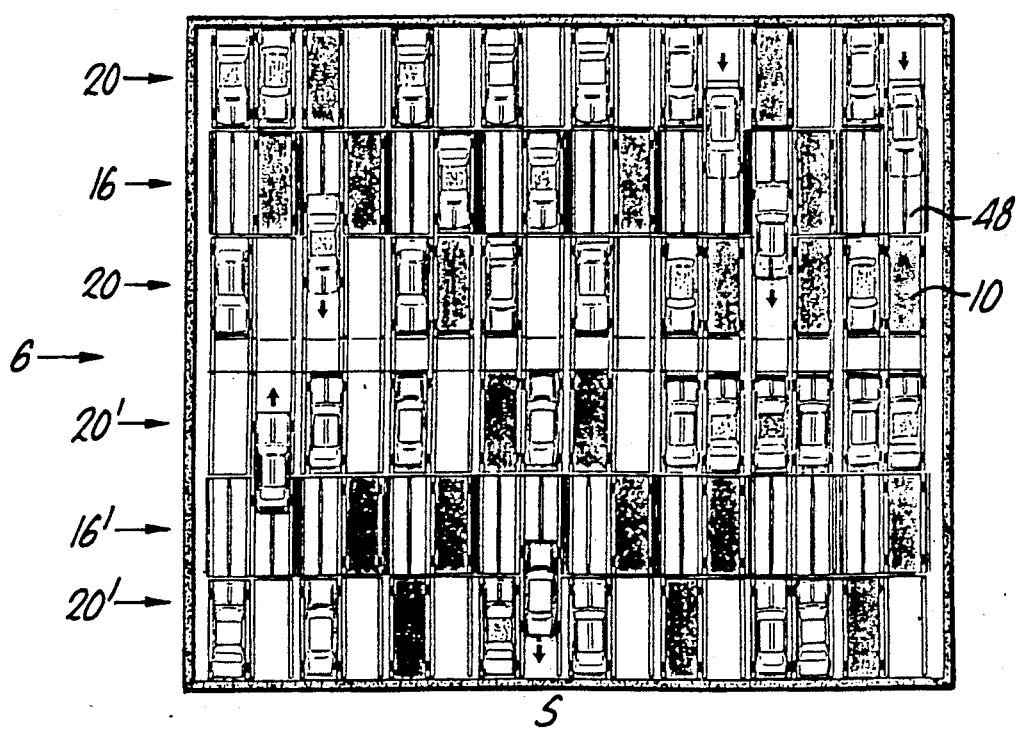
FIG. 3 is a top view of one of the parking levels of the garage.
Figure 4:
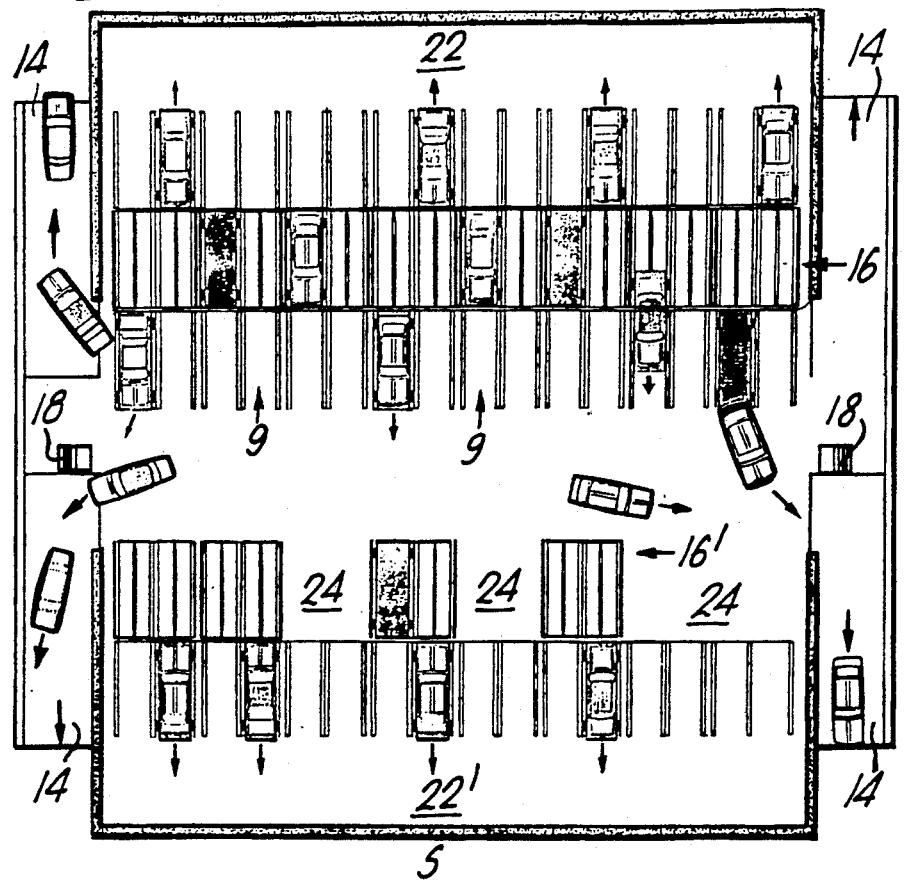
FIG. 4 is a top view of the basement level of the parking garage of FIG. 1.

Referring now to the drawings, there is shown in FIGS. 1–4 a linear type of the parking garage according to the invention. This structure represented in FIG. 1 in perspective view comprises a main floor 2 (FIG. 2). a plurality of parking levels 6 (FIG. 3) and a basement 4 (FIG. 4). Seen in FIG. 1 are the row of parking entrance stations 8 (another such row being located at the opposit side of the building) some with vehicles already mounted on the wheeled vehicle pallets (in the following, VP's) 10 and ready for parking, the exit ramps 12 descending from the main floor 2 to the street level (another such ramp being located on the opposite side of the building), and the exit ramps 14 ascending from the basement to the street level. Driver service terminals (not shown) are arranged next to each group of entrance stations 8.

The garage structure of FIG. 1, given by way of example, has 16 entrance stations on each side. To make economic use of space, the stations 8 are very closely spaced, as is clearly seen in FIG. 1. In order not to overtax the maneuvering capabilities of drivers, it is advantageous to stagger access to the stations, say, by permitting access for a given period of time only to the odd-numbered stations, then, for the same period, only to the even-numbered stations. This can be achieved either by providing red and green traffic lights atop each station, or by the use of automatic barriers connected to the computer circuit.

Figure 2:
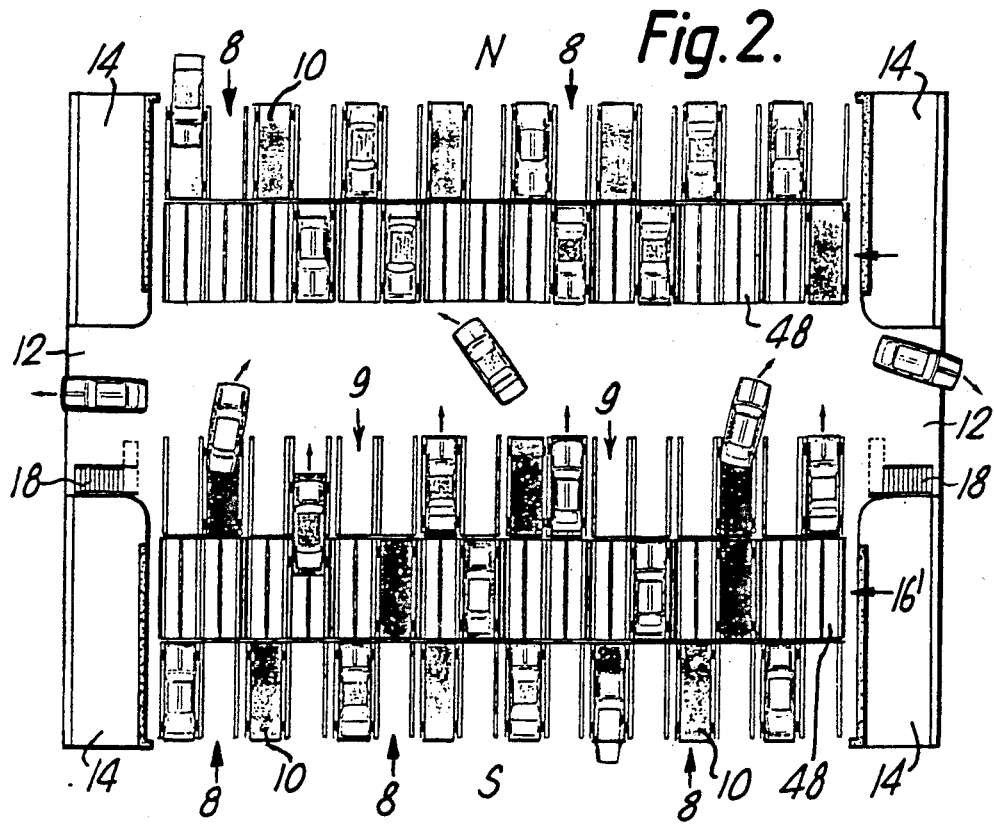
FIG. 2 illustrates the main floor of the parking garage of FIG. 1.

The main floor 2 is illustrated in FIG. 2 and is seen to comprise two wings which, arbitrarily, and following map convention, will be referred to as northern (N) and southern (S). Each wing, as already explained, has its entrance stations 8. Part of the entrance stations 8 are seen to be already occupied by vehicles which their owners had previously driven onto VP's 10 readied at the stations 8, and about to be moved, together with their loads, onto elevators 16, 16' of which each wing (N,S) has several. These elevators will eventually move the respective VP's 10 and the vehicles standing on them to vacant parking stalls on the parking levels 6. The VP's 10 and elevators 16, the respective functions of which have been summarized in the aforegoing, will be described in greater detail further below.

The main floor 2 is also used as retrieval and pick-up level for vehicles parked in the southern wing S. Vehicles marked by arrows have been picked up by their owners at the exit stations 9 and have been, or are about to be, driven off their respective VP's on their way down the exit ramps 12 into the street. To prevent jams and collisions liable to be caused by an excessive number of vehicles trying to exit simultaneously, vehicles parked in the northern wing N are released in the basement 4 (FIG. 4), which can be reached by stairs 18.

A top view of one of the parking levels 6 is shown in FIG. 3. Seen are the rows of elevators 16, 16' in the wings N and S, and the row of parking stalls 20, 20' which flank their respective elevator rows.

The presence of empty VP's 10 in some of the parking stalls and/or some of the elevators will be explained further below in conjunction with the elevators themselves.

The basement 4, shown in FIG. 4 serves two purposes: as retrieval and pick-up level for the northern wing N (with vehicle leaving via ascending ramps 14) and as location for various car services which the driver can order when "clocking in", such as gas, oil change or topping up, car washing, air, etc. These services are given in the areas 22,22', as well as in the spaces vacated by four elevator stations 24 (the elevators 16' vertically associated with these stations do not descend beyond the main level 2).

One of the central components of the parking garage according to the invention is, as already mentioned, the vehicle pallet VP, denoted by numeral 10, onto which a vehicle to be parked is driven and on which it stays for the whole parking Period. The VP is schematically represented in FIGS. 5 to 8.

FIG. 5 shows the VP to consist of a non-motorized platform-like structure having a surface 26 advantageously consisting of riffled steel sheet for better tire grip and having a size compatible with the largest vehicle to be accepted for parking. For safely immobilizing a vehicle throughout its stay in the parking garage, there are provided relatively shallow, trough-like recesses 27 across the surface 26 for the vehicle's front wheels to drop into. A cross-sectional view of such a recess is given in FIG. 7, which also shows a vehicle tire T resting inside the recess 27. Also seen is a low ridge 28 provided to slow down the driver and warn him of the impending drop of the front wheels. Further seen are guide wings 29 preventing the wheels from sliding off the VP.

In an alternative embodiment of the VP (not shown), the recesses 27 are replaced by rubber mats with heavy serrations into which the wheels are sinking.

The VP has four wheels 30 rotatably mounted on brackets 32 fixedly attached to the frame of the VP and running in profiled guide tracks or rails 34 which, at the entrance and exit stations 8,9 and in the parking stalls 20, are fixedly mounted on the level floor and, in the elevators 16, as will be seen, on special platforms.

Further seen are two dragging brackets 36,36', one at each end of the VP 10, having in cross section, as seen in FIG. 7, the shape of two teeth with a tooth gap 38 between them, in which is adapted to engage a special drive tooth of an endless chain to be described in conjunction with the elevators 16, and designed, as will become apparent, to drag the VP into, and off, the elevator 16.

Further provided are two narrow recesses 40, 40' which, in conjunction with a catch mechanism to be explained further below, serve to immobilize the VP at the various stations to prevent inadvertent movement of the VP due to reaction to the ascending or descending vehicle wheels, or recoil from the parking stall buffers, and to precisely position the dragging bracket 36, 36' so that that above-mentioned drive tooth will be able to smoothly engage and mesh therewith.

Figure 6:
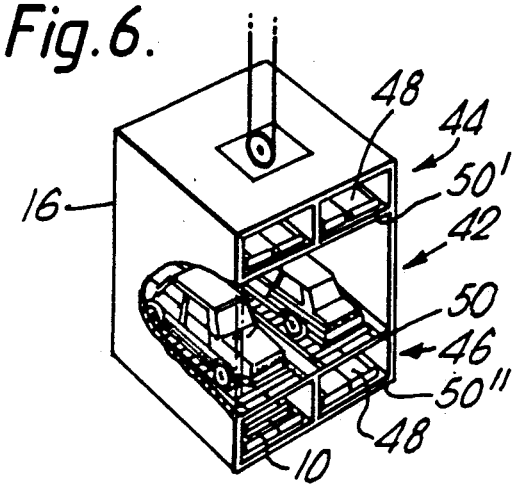
FIG. 6 is a perspective representation of one of the elevators according to the invention, with two cars as mounted on their respective vehicle pallets.

Two more of the major components mentioned in the above summary are the elevators and the transfer platforms. One of the former, open to the front and to the rear, is illustrated in FIG. 6 and is seen to be of the three-tier type, a central tier 42 which, in this embodiment, accommodates two vehicles on their VP's 10, and an upper and lower tier 44 and 46, respectively. Each tier is provided with two transfer platforms 48 (in the following: TP) which rest on the respective bottom surfaces 50,50',50" of the tiers.

Since as already mentioned each parked vehicle stays with its VP until its release, a large number of VP's is required. The question thus arose as to where to store these VP's when the garage is not in use, e.g., during a substantial part of the night. It is these upper and lower tiers that serve as magazines used to solve the problem of logistics involved in the circulation and storage of the VP's. The upper magazines are used to move VP's for storing them in vacant parking stalls when the garage is not active, and to bring them to the entrance stations 8 in the morning hours, while the lower magazines transfer the vacated VP's from the exit stations 9 to the entrance stations 8.

The TP 48 is shown in FIGS. 7 and 8, and is seen to comprise an endless chain 52 running over two chain sprockets 54 rotatably mounted at the two ends of the platform 48, one of which sprockets is driven by an electric gear motor 55 of the reversible type. There is also provided, either attached to one of the chain links, or integral therewith, a projecting tooth 56 which is of such shape and length that, as was already mentioned, when the chain 52 moves, the tooth 56 will engage in one of the dragging brackets 36 of the VP 10 and drag the latter along. (An embodiment is also envisaged in which the chain 52 is provided with two teeth 56 arranged at such a distance from one another that when one tooth disengages, say, from dragging bracket 36, the other will engage dragging bracket 36'). A sequence of this process is illustrated in FIGS. 12a–12h and will be discussed further below.

In order to move the VP from, say, an entrance station 8 into the elevator 16, a continuity is required between the fixed guide rails 34 of the entrance station and the rails 34 that are mounted on the TP 48. However, since the rails 34 of the entrance stations 8 must stop some distance in front of the elevator shaft, and the rails 34 on the TP 48 cannot permanently project beyond this shaft as otherwise the elevators 16 could not move from level to level, provision must be made, at the elevator stops, for the TP to temporarily move towards the respective station until such continuity is obtained, and then, the VP 10 having been pulled aboard the TP 48, to move back again, to clear the elevator shaft.

This is achieved by making the TP 48 slidable. To this end the TP is mounted on, and between, rollers 58 seated in bearing brackets 60 that give it one degree of freedom in translation, i.e., permit it to move in the longitudinal direction which, with respect to FIG. 8, would be into and out of the paper.

Figure 9:
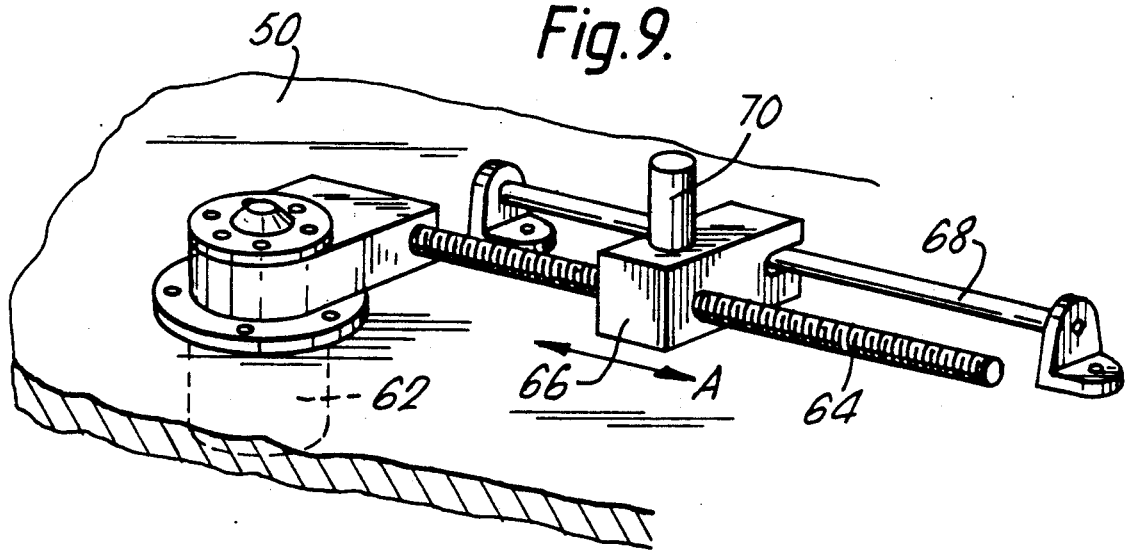
FIG. 9 is a schematic perspective view of a screw-and-nut drive to provide a controllable movement of the transfer platform in the elevator.

One way of obtaining a controllable movement of this kind is illustrated in FIGS. 8 and 9.

There is provided a gear motor 62, fixedly mounted on the bottom surface 50 of the tiers. The motor drives a screw 64, preferably of the low-friction ball-screw type, on which rides a nut 66. Being prevented from rotating together with the screw by a bar 68 also mounted on surface 50' the nut 66' depending on the sense of rotation of the screw, can only move in direction of double arrow A. The nut 66 carries a drive pin 70 which fits a slot 71 provided in the TP. Movement of the nut 66, caused by rotation of the screw 64 will thus produce a movement of the TP. This movement can be controlled to close limits by either using a stepping motor or by providing adjustable stops acting on microswitches.

Clearly, the motor 62 and bar 68 could also be mounted on the TP, with the drive pin 70 extending downwards into a slot 71 provided in the tier surface 50.

It is obviously possible to obtain the required TP movement also by means other than the screw-and-nut arrangement described, for instance a gear-pinion-and-rack combination, or a double-acting hydraulic cylinder or the like.

Figure 10:
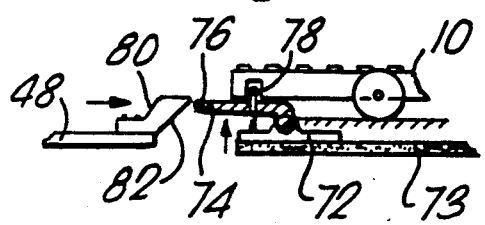
FIGS. 10 and 11 are schematic representations of a detent device for immobilizing respectively releasing the vehicle pallet.
Figure 11:
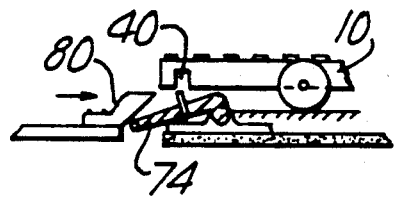

The above-mentioned catch mechanism that immobilizes the VP 10 at a predetermined point is installed at all entrance and exit stations and is shown in two limit positions in FIGS. 10 and 11.

A bracket 72 mounted on the concrete floor 73 of each level on each side of the elevator shaft pivotably carries a lever 74 with a roller 76 at its end. A spring (not shown) provides upward bias and a toothlike projection 78 mounted on the lever is thereby forced into the already mentioned narrow recess 40 in the VP 10.

On both ends of the TP 48 there is provided a cam plate 80 having a slanting camming edge 82. When now the TP advances (to provide the above-mentioned continuity), the slanting camming edge 82 will hit the roller 76 and thus depress the lever 74, thereby withdrawing the projection 78 from the recess 40 and releasing the VP 10 which, as soon as the tooth 56 engages the dragging bracket 36 is pulled onto the TP 48 inside the elevator 16'. At the assigned parking stall, the TP 48 moves to the left to provide continuity, thus depressing the lever 74' at the left side of the elevator shaft. When the VP 10 is then dragged off the TP, and the latter is withdrawn, the projection 78 shoots into the recess 40 and immobilizes the VP 10.

The movement of VP's into and out of the elevators 16 is shown in stages in FIGS. 12a–12h.

Figure 12A:
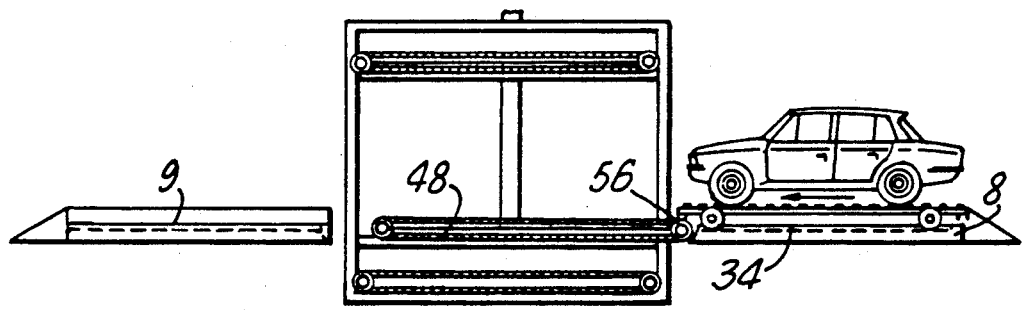
FIGS. 12a–12h illustrate different stages in vehicle parking and retrieving.

In FIG. 12a a vehicle has mounted the VP 10 in the entrance station 8. The TP 48 has moved to the right and provides the required continuity of guide rails 34.

Figure 12B:
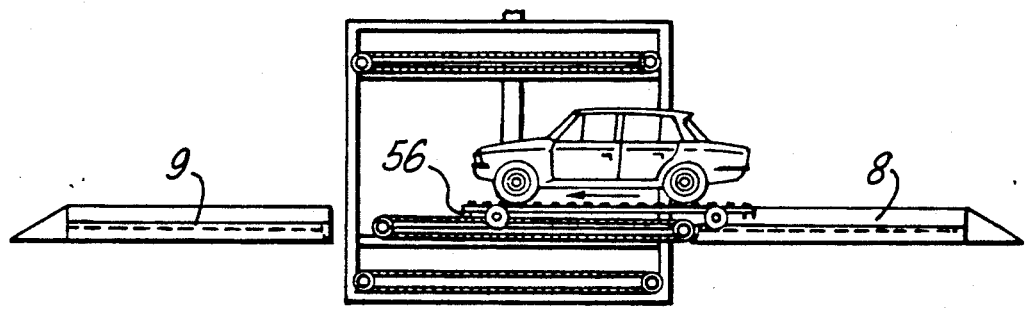

In FIG. 12b the dragging tooth 56 has already halfways pulled the vehicle in.

Figure 12C:
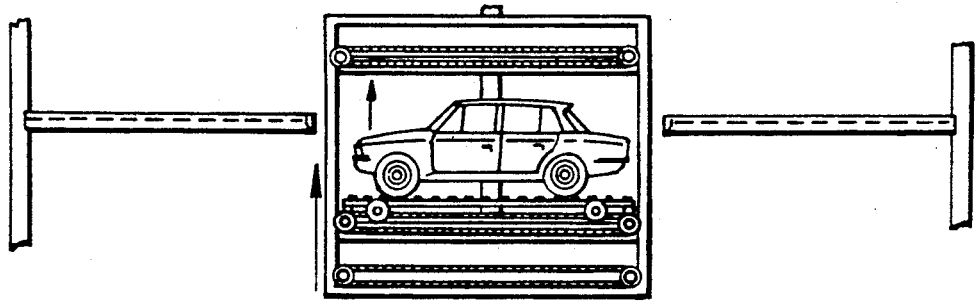
Figure 12D:
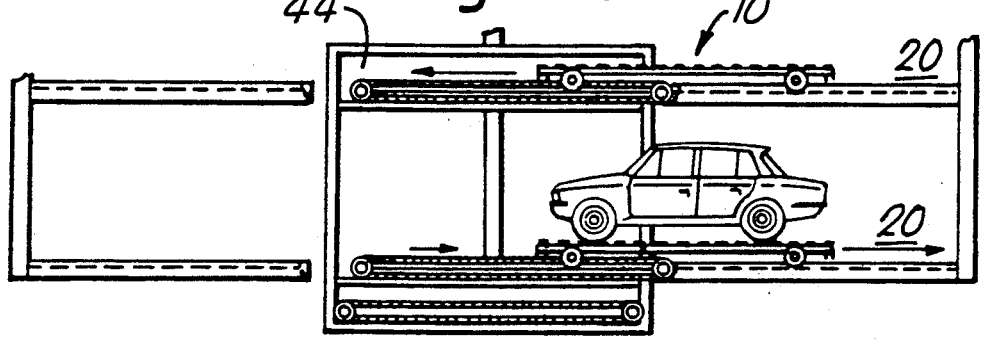

This action is completed in FIG. 12c, and after the TP 48 has been pulled back, the elevator 16 moves upwards, toward a vacant parking stall.

Having arrived there, two actions are taken: the VP moves into the parking stall 20, and the TP 48 in the upper magazine 44 is hauling in a vacant VP that was stored in a parking stall 20 of the next-higher level.

Figure 12E:
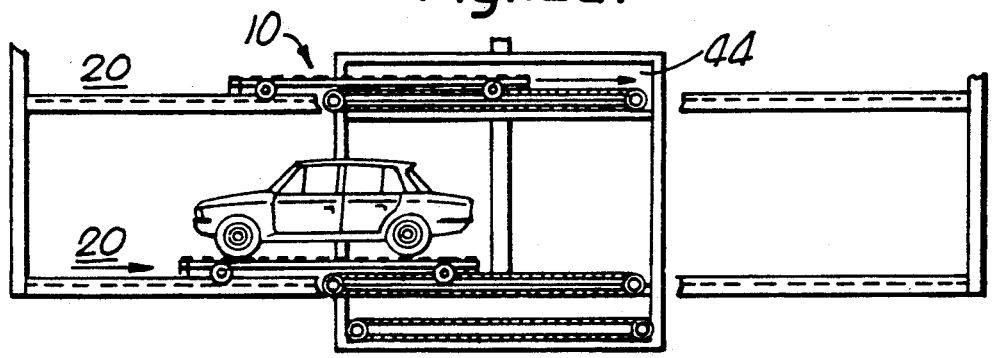

In FIG. 12e a loaded VP is withdrawn from a parking stall 20, and a vacant VP is hauled into the upper magazine from a parking stall 20 in the next-higher level.

Figure 12F:
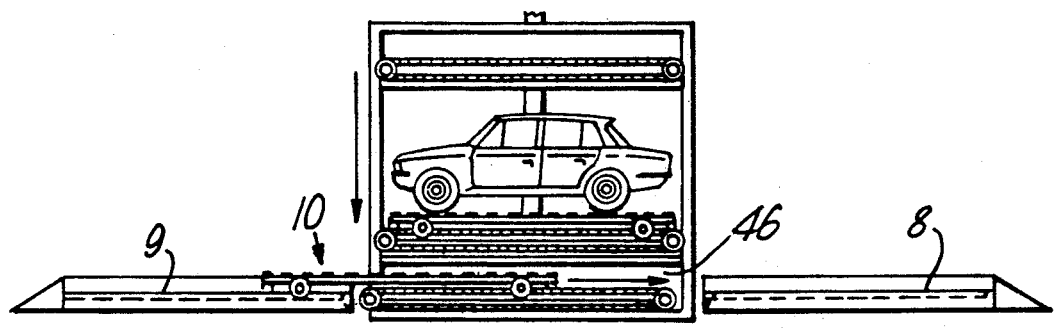

In FIG. 12f an elevator with a VP carrying a vehicle that has been recalled has almost arrived at an exit station 9, but first a VP that has been vacated by an exiting vehicle must be cleared away. This is done by hauling it into the lower magazine 46 of the elevator.

Figure 12G:
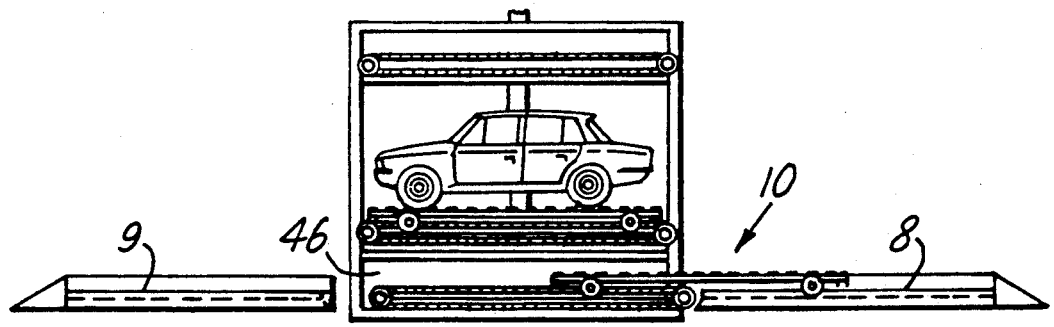

In FIG. 12g the vacant VP in the lower magazine 46 is returned to an entrance station 8.

Figure 12H:
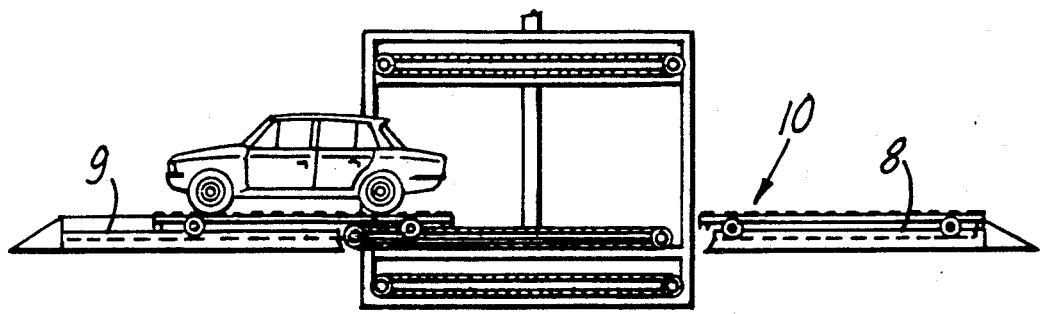

In FIG. 12h the VP moves into the exit station 9 to be picked up by its owner.

Figure 13:
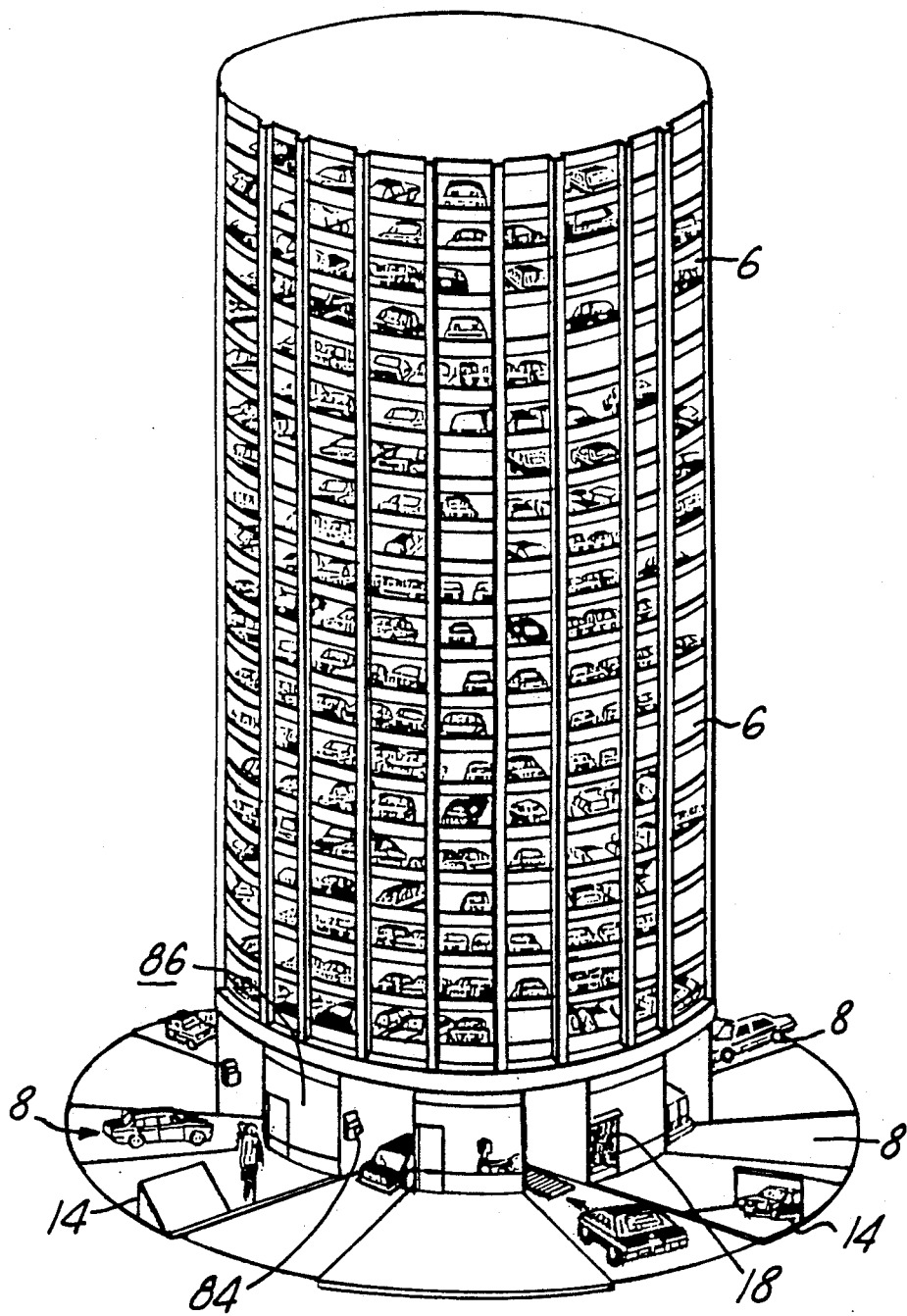
FIG. 13 is a perspective view of a circular multi-level parking garage according to the invention.

FIG. 13 represents another embodiment of the parking garage according to the invention, characterized by its cylindrical tower of parking levels 6.

Figure 14:
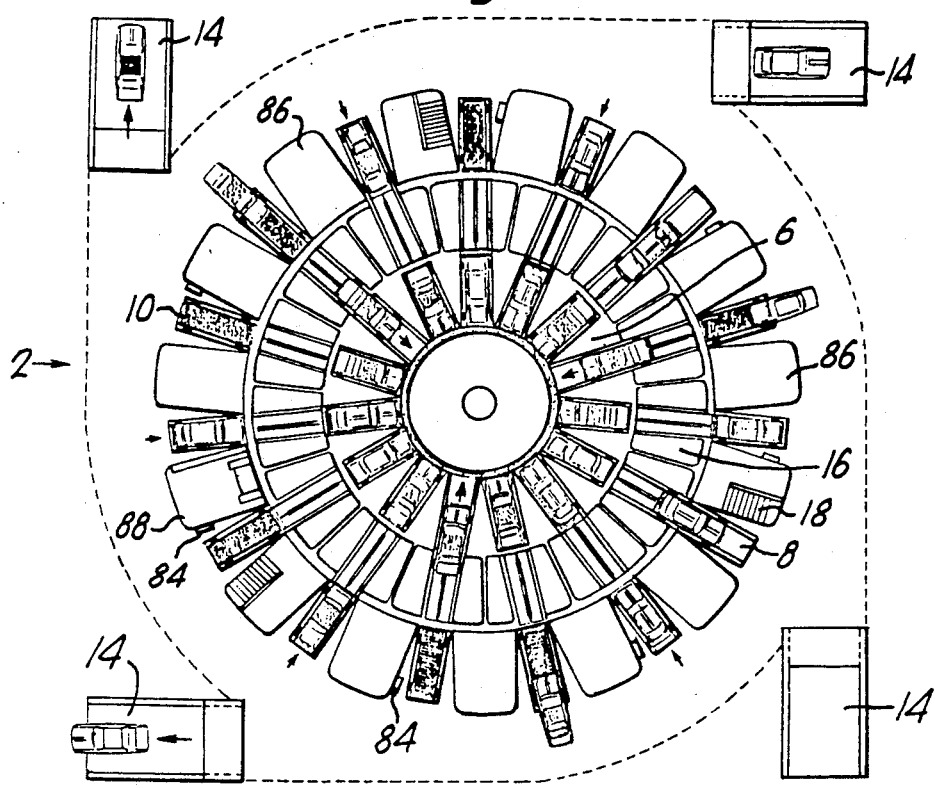
FIG. 14 illustrates the main floor of the parking garage of FIG. 13.

FIG. 14 shows the general layout of the main floor of this structure. The outer ring is taken up by shops and offices 86, the computer room 88, stairways 18 to the basement and the entrance stations 8. Drivers' service terminals 84 are arranged within easy reach of the stations 8. The intermediate ring of elevators 16 and inner ring of parking stalls will be discussed further below. Seen are also four tangential exit ramps 14 originating in the basement.

Figure 15:
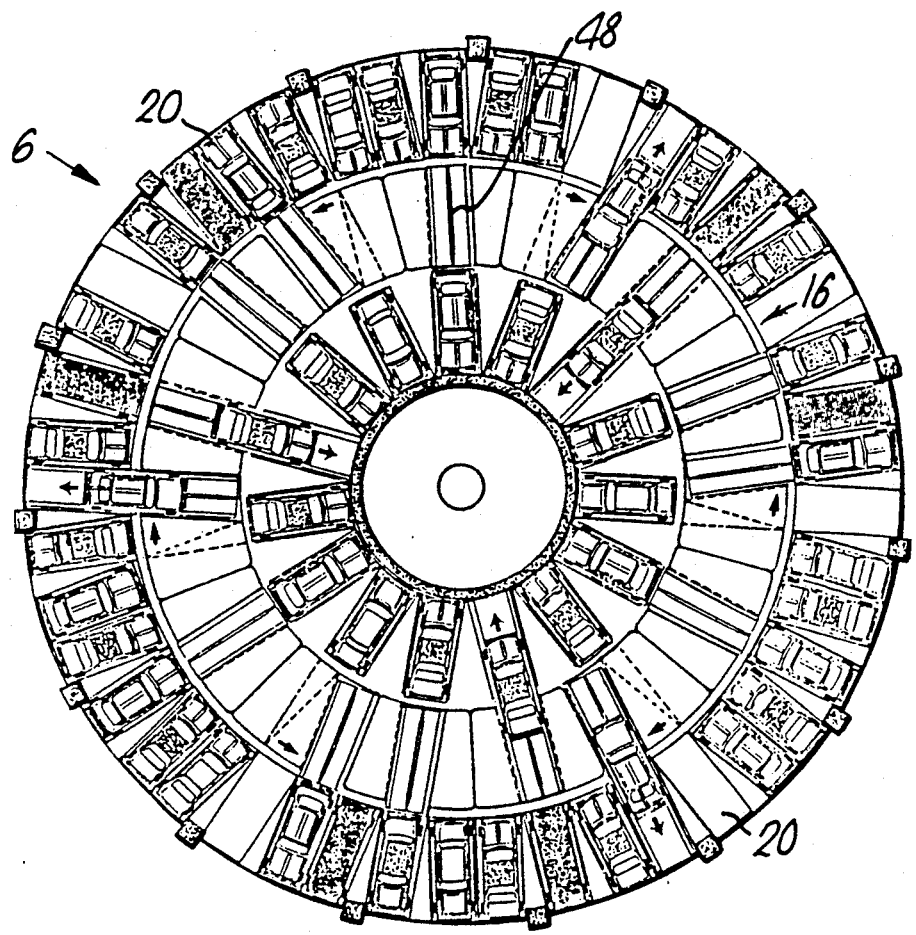
FIG. 15 is a top view of one of the parking levels of the garage.

FIG. 15 illustrates the parking levels 6. It is seen that the outer ring which, in the main floor was taken up by entrance stations, offices, etc. now constitutes the main parking area, accommodating as it does three times as many vehicles as the inner ring.

Figure 16:
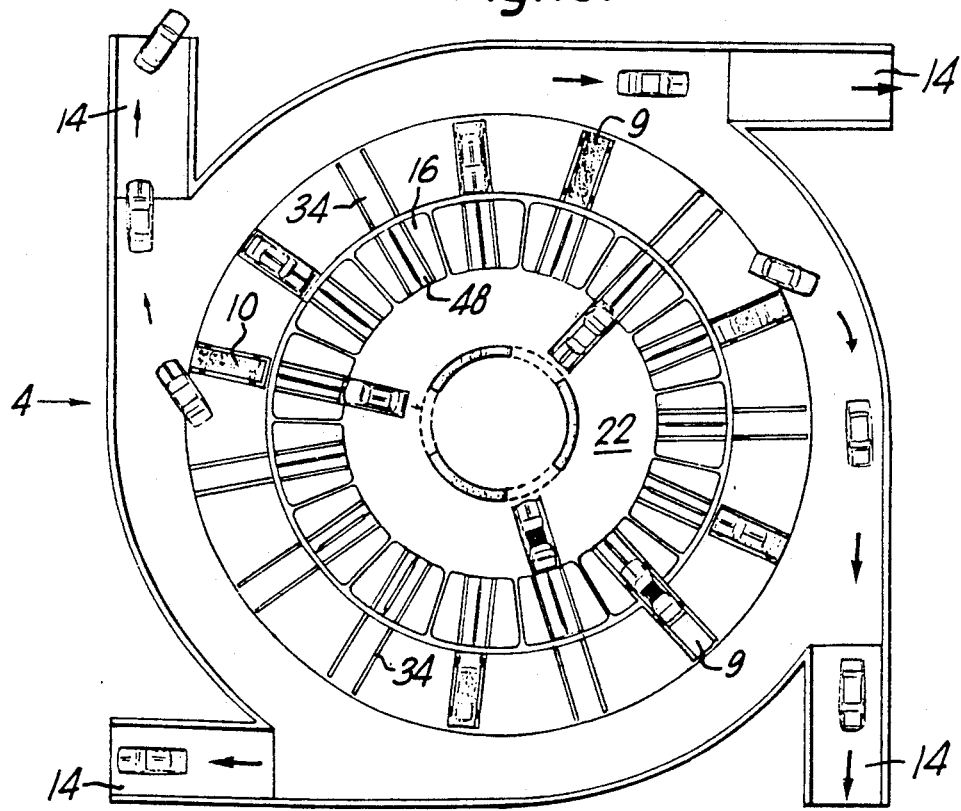
FIG. 16 is a top view of the basement level of the garage of FIG. 13.

The basement 4 is represented in FIG. 16. There, the inner ring is used as car service area 22, while the outer ring accommodates the exit stations 9. The tangential exit ramps 14 lead to the street level.

The structural differences between the embodiment of FIG. 1 and the present embodiment are mainly due to the different geometries involved. From FIG. 14 and 15 it is obvious that the parking garage of FIG. 13 consists of concentric rings: an inner, intermediate, and outer ring. While the inner and outer ring are constituted by parking stalls 20 (except for the main and basement levels), the intermediate ring is formed by the elevators 16. The concentric-ring shape of the parking areas has important consequences for the shape and operation of the elevators 16. Since the outer parking ring obviously accommodates more vehicles than the inner ring, the elevator 16 which in this embodiment has the shape of an annular sector, must be able to serve not only the inner-ring parking stall and its co-radial outer-ring stall, but also the two non-co-radial outer-ring stalls that flank this co-radial stall.

This is achieved by a special arrangement, illustrated in principle in FIGS. 17a–17c, whereby the TP 48, apart from its short, longitudinal, continuity-producing movement, can also perform a slewing motion, describing an arc the center of which coincides with the common center of the three rings.

FIG. 17a shows the TP 48 in its central position, in which it accepts VP's from the entrance station 8 (FIG. 14) and in which it can serve a parking stall of the inner ring as well as the co-radial stall of the outer ring, while FIGS. 17b and 17c show the TP's 48 in the slewed positions in which they can transfer VP's to the outer-ring stalls that flank the co-radial stall.

Technically, the slewing motion can be obtained in several ways, two of which are schematically illustrated in FIGS. 18 and 19. In the arrangement of FIG. 18 there is provided a pair of meshing gears 90, 90' carrying arms 92,92' and drivable by the output pinion 94 of a gear motor. From their initial position shown in solid lines, these arms can be swung into either one of the positions indicated by broken lines. At the ends of the arms 92, 92' are provided rollers 96 which engage in a longitudinal slot provided in a sub-platform 97 (indicated by dash dotted lines) on which is mounted the TP 48. When the arms 92,92' are swung to either of the above positions, the sub-platform 97 together with the TP will be shifted from the symmetrical position A either to position B or to position C. It should be noted that the effective length of arm 92' is slightly larger than that of arm 92, to ensure the radiality of the longitudinal centerline of the sub-platform also in the extreme positions B and C.

FIG. 19 illustrates another arrangement for obtaining the required slewing motion. There, a sub-platform (not shown) is adapted to travel along curved guide rails 98 when a force is applied by an arm 100 to the end of which it is articulated. The arm 100 is shown in three possible positions and is actuated by a hydraulic cylinder 102.

Although not seen in FIGS. 14–19, the elevator 16 of the circular parking garage, too, is provided with a top magazine above, and a bottom magazine below, the elevator cabin. These magazines accommodate one vehicle pallet each and are located in the vertical plane of symmetry of the elevators 16.

Yet another embodiment of the invention is represented in FIGS. 20 to 25, being a parking garage built on top of a business enterprise such as a multi-floor department store.

A special feature of this embodiment, to be explained in greater detail further below, is the possibility, open to customers of the department store, to call down the elevator carrying their vehicles to any one of the shopping floors, enter them together with their purchases and descend, inside their vehicles, to the basement for exiting.

A general view of the structure is given in FIG. 20, showing the entrance stations 8 at street level as well as the exit ramp 14 ascending from the basement. Entrance into the store is at the four corners.

In the partial, cross-sectional view of FIG. 21 can be seen the entrance stations 8, the elevator 16 which is of the single-cabin type, but moves in a shaft 104 that has room for two such elevator cabins. On its way to the parking level 6, the shaft 104 passes through all shopping floors 106. Vehicle exit is through the basement 4 and up the exit ramp 14 (FIG. 20).

FIG. 22 represents the ground level of the structure of FIG. 20. There are seen on the northern as well as on the southern side six elevator shafts 104, each accommodating two separate elevators 16. Also shown are the exit ramps 14.

FIG. 23 illustrates one of the shopping floors 106, including the elevator shafts 104 passing through them. Each shaft is accessible through two doors 108, one at the front and one at the side. Each door opens upon a gangway 110 from which the vehicle can be entered.

FIG. 24 represents, to a larger scale and in perspective, the detail A of FIG. 23. There is seen a counter 112 to which customers bring their purchases for packing and billing. If a customer wishes to make use of the elevator facility, he provides the cashier with the required information (registration number, code). The cashier, who has his own terminal, enters these data and adds the parking fee to the bill. Upon payment, the cashier recalls the vehicle, which arrives within a short time. Of course, customers are free to use the store's house elevators for going down to the basement and call for their vehicles at the drivers' service terminal located there.

Apart from the single-cabin feature, the parking levels 20 are substantially identical to those of the embodiment of FIG. 1.

While the embodiments described in the aforegoing referred to above-ground parking garages, it should be understood that the principles embodied in the invention are equally applicable to underground parking structures.

As already mentioned, the control system of the parking garage according to the invention is completely computerized. A computer, located in the computer room on the main floor (see, e.g., FIG. 14, numeral 88) supplies all control and activation signals for the power elements of the system. Through the use of a set of software routines for decision making and a dual communication network, the computer analyzes incoming data and requests from various input units and activates accordingly various output units. It also monitors the correct functioning of all input/output units.

Peripheral units connected to the computer via a communication network can be divided into two main groups: System Interface Units (SIU's) and User Interface Units (UIU's). SIU's are connected to the computer via the System Communication Network (SCN) while UIU's are connected via the User Communication Network (UCN). These groups are further divided into input-only units and combined input/output units (FIG. 25).

The User Interface Unit (UIU) (FIG. 26) is a microprocessor controlled Data Terminal Equipment (DTE) designed to serve users of the parking garage at time of arrival as well as for car retrieval.

Under control of the local micro processor, a UIU communicates with the main computer and activates its own input/output equipment.

A typical UIU consists of the following input/output units:

Inputs (FIG. 26)

A numeric keyboard for user presentation of data to the main computer both at arrival and departure. Such data would be vehicle registration number, a secret code number and, if required, the type of vehicle services to be provided on the service floor.

An optical ticket reader, used at departure, to enable the main computer to match the encryptedly punched code number on the ticket with the number input via the keyboard.

For purpose of verification, the reader also retrieves other data from the punched ticket such as vehicle's location and time of arrival, so the computer can compare these data with those saved in its memory at time of arrival.

A credit-card reader for charging parking fee at departure time.

An electromechanical unit for accepting coins and/or bills as parking fee at departing time.

Outputs

An alphanumeric type display is used to present the user with various operating instructions at arrival time and information concerning parking fee at departure.

A ticket puncher and/or paper printer for providing user with an identification ticket at arrival and a money receipt at departure.

A UIU is connected to the main computer via a User Communication Network by a standard link such as RS232.

The System Interface Units (SIU) (FIG. 27) comprise electronic supervisory input means and activation output means to automatically operate the garage. They interface the main computer with the mechanical elements of the garage. The input only units provide information from remote sensors while the input/output units are responsible for mechanical activation requirements. All units are capable of supplying self-test information to the main computer.

Inputs

Position sensors (e.g., optical sensors) to monitor in a closed-loop manner the location of elevators, moving platforms, rotating chains, etc. These sensors also check the vehicle's dimensions against the allowed maximum.

Weight sensors to identify a parking stall as vacant or occupied in order to verify this information against the computer knowledge based on its previous actions of accepting or retrieval of cars.

Video cameras for either visual monitoring by a human operator or computer control by video processing techniques.

Outputs

Power actuators (e.g., solenoids, contactors) for activating electrical motors of elevators, transfer platforms, etc.

System interface units communicate with the main computer via the System Communication Network (SCN). In order to save a very substantial amount of cabling, the SCN comprises a single-cable-four wire system with all SIU's connected in parallel.

Two wires supply power to the SIU's, one is for bidirectional digital transmission and one for analog readings by the computer. Each SIU has a unique address and, while all SIU's receive all communication messages, only the one with its address matching the one transmitted in the message reader responds. This technique enables the computer to randomly address, and communicate with, any required SIU.

The Driver Service Terminal, described earlier as a UIU unit (FIG. 26) is graphically represented in FIG. 28. Also provided is a back-up generator unit automatically taking over in case of net power failures.

FIGS. 29 and 30 represent a storage structure for shipping containers. As stated earlier, this structure operates on the same principles as does the above explained parking garage and uses similar elements. Thus, there is seen the main level 2 on which are erected a number of storage levels 6 as well as a central structure for the elevators 16. Also seen are the entrance stations 8 and the exit stations 9. In addition to the previous structure are the loading stations 5 and the unloading stations 7, the former being contiguous with the entrance stations 8, the latter with the exit stations 7. The wheeled pallet 10 of this embodiment is similar to that of the parking garage, except that, obviously, it does not require the various means for immobilizing the vehicle to be parked. Instead, there are provided four raised corners 31 which define the position of the standard container.

In operation, vacant CP's (container pallets) 10 are always brought to the loading station 5 onto which lead the guide rails 34. A crane 33 places a container to be stored on a vacant CP and as soon as the container number has been punched in and the "STORE" button pressed, the automatic sequence takes over. By means of a dragging arrangement 11 similar to that illustrated in FIG. 7, the CP is drawn onto the entrance station 8, where the drag chain disengages from the dragging bracket 36 of the CP and the tooth 56 of the TP chain 52 takes over, pulling the CP into the elevator 16. The latter lifts the CP and its load to the floor determined by the central computer, where the CP is drawn from the elevator 16 to the predetermined storage location.

Retrieval of a container is effected in a manner analogous to the vehicle retrieval explained in detail earlier. At the end of the retrieval sequence, the CP is dragged to the unloading station 7, where it is picked up by another crane and loaded onto the waiting truck.

While the control system of this embodiment is basically similar to the control system explained in conjunction with the parking garage, it must obviously be compatible with port routine.

It will be evident to those skilled in the art that the invention is not limited to the details of the foregoing illustrative embodiments and that the present invention may be embodied in other specific forms without departing from the spirit or essential attributes thereof.

What is claimed is:

1. An automatic multi-level storage structure comprising:
    a building structure having at least one entrance and exit station for respectively introducing an object for the storing thereof and withdrawing said object after retrieval thereof, a main floor directly accessible from said entrance station, and a plurality of storage levels:
    a plurality of object pallets provided with wheels and adapted to carry objects to be stored, said pallets being movable along, and guided by, first track means fixedly attached to a floor of each level;
    at least one storage elevator adapted to accommodate at least one of said object pallets at a time and vertically movable between said main floor and said plurality of storage levels;
    at least one transfer platform permanently located in said at least one elevator and provided with second track means fixedly attached to said platform, said second track means adapted to accept and guide the wheels of said object pallet, and further provided with first drive means for moving said object pallet onto said transfer Platform and subsequently moving it off said platform,
    second drive means for engaging said transfer platform enabling it to move longitudinally in both directions beyond the limits of said elevator far enough to ensure continuity, either on one side of said elevator or on the other side thereof, between said first track means fixedly attached to said floor of each level, and said second track means fixedly attached to said transfer platform, and wherein an object to be stored is moved onto one of said object pallets at said at least one entrance station and, for the duration of its stay in said storage structure, remains standing on said one of said object pallets, and said one of said object pallets being moved from an entrance station onto an elevator and from said elevator to a storage location on one of said levels and subsequently from said storage location, via said elevator, to said exit station.

2. The storage structure as claimed in claim 1, wherein said first drive means is an endless chain having at least one drive tooth engageable with a meshing element fixedly attached to said object pallet.

3. The storage structure as claimed in claim 1, further comprising means for immobilizing, and defining the position of, said object pallet preceding its transfer onto, during its stay on, and following its removal from, said transfer platform.

4. The storage structure as claimed in claim 1, wherein said first drive means is movable by an electric motor.

5. The storage structure as claimed in claim 1, wherein said second drive means is either a linear screw-and-nut, a rack-and-pinion, or a hydraulic drive.

6. The storage structure as claimed in claim 1, wherein said first and second track means are profiled guide rails.

7. The storage structure as claimed in claim 1, wherein said transfer platform is engageable by third drive means enabling said transfer platform to move also laterally.

8. The storage structure as claimed in claim 1, wherein said elevator accommodates at least one object, and is provided with at least one magazine for accepting and moving vacant object pallets between said exit stations, said storage locations and said entrance stations.

9. The storage structure as claimed in claim 1, wherein said object is a vehicle and wherein provision is made at one or more floors of said structure, to call an elevator carrying a retrieved vehicle and have it stop at any of said floors of said structure, further provision being made for access, at said floors, through apertures in the elevator shaft, to said vehicle.

10. The storage structure as claimed in claim 1, wherein said object pallet is provided with means for defining the location of, and at least partly immobilizing, said object when placed upon said pallet.

11. The storage structure as claimed in claim 10, wherein said object is a vehicle and said means is at least one trough-like recess into which one pair of vehicle wheels are intended to drop.

12. The storage structure as claimed in claim 10, wherein said object is a shipping container and said means is at least two raised corners defining the location of said container on said pallet.

13. The storage structure as claimed in claim 1, further comprising a control system.

14. The storage structure as claimed in claim 13, wherein said control system is computerized and comprises a main computer associated with a system communication network including system interface units, and a user communication system including user interface units.

* * * * *